United States Patent
Qi et al.

(10) Patent No.: US 11,641,266 B2
(45) Date of Patent: May 2, 2023

(54) LATENCY COMPENSATION METHOD AND DEVICE

(71) Applicant: Huawei Technologies Co., Ltd., Shenzhen (CN)

(72) Inventors: Yunlei Qi, Dongguan (CN); Chunrong Li, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 190 days.

(21) Appl. No.: 17/018,538

(22) Filed: Sep. 11, 2020

(65) Prior Publication Data
US 2021/0006386 A1    Jan. 7, 2021

Related U.S. Application Data (63) Continuation of application No. PCT/CN2019/077715, filed on Mar. 11, 2019.

Foreign Application Priority Data

Mar. 13, 2018 (CN) .......................... 201810203433.5

(51) Int. Cl.
*H04L 7/00* (2006.01)
(52) U.S. Cl.
CPC .................................. *H04L 7/0041* (2013.01)
(58) Field of Classification Search
CPC ............... H04L 7/0041; H04L 43/0858; H04L 43/0864
See application file for complete search history.

(56) References Cited

U.S. PATENT DOCUMENTS

| | | | |
|---|---|---|---|
| 8,064,485 B1 * | 11/2011 | Montini | H04J 3/0673 398/154 |
| 10,313,103 B1 * | 6/2019 | Perras | H04B 10/516 |
| 11,082,142 B2 * | 8/2021 | Zhong | H04L 27/2666 |
| 2002/0001252 A1 | 1/2002 | Shin | |
| 2010/0283648 A1 | 11/2010 | Niwa et al. | |
| 2013/0155945 A1 | 6/2013 | Chen | |

(Continued)

FOREIGN PATENT DOCUMENTS

| | | |
|---|---|---|
| CN | 101425891 A | 5/2009 |
| CN | 101499871 A | 8/2009 |

(Continued)

OTHER PUBLICATIONS

Li, R. et al., "X-EtheNet: Enabling integrated Fronthaul/Backhaul Architecture in 5G Networks", 2017 IEEE Conference on Standards for Communications and Networking (CSCN), Sep. 18, 2017, 5 pages.

(Continued)

*Primary Examiner* — Elton Williams
(74) *Attorney, Agent, or Firm* — Slater Matsil, LLP (57) ABSTRACT

A device determines a first latency value of a first data flow from a first physical port of the device to a second physical port of the device and a second latency value of a second data flow from the second physical port to the first physical port, where the first latency value is less than the second latency value. The device determines a first target latency value based on the first latency value and the second latency value. The device adjusts a latency value of the first data flow to the first target latency value.

20 Claims, 3 Drawing Sheets

(56) References Cited

U.S. PATENT DOCUMENTS

2014/0092918 A1\* 4/2014 Jost .................. H04J 3/0697
370/465
2017/0171163 A1 6/2017 Gareau et al.

FOREIGN PATENT DOCUMENTS

| CN | 102036127 A | 4/2011 |
| --- | --- | --- |
| CN | 102136901 A | 7/2011 |
| CN | 102137483 A | 7/2011 |
| CN | 103078723 A | 5/2013 |
| CN | 103299582 A | 9/2013 |
| CN | 104954092 A | 9/2015 |
| EP | 2497211 A1 | 9/2012 |
| EP | 3278518 A1 | 2/2018 |
| WO | 03052396 A2 | 6/2003 |
| WO | 2019174554 A1 | 9/2019 |

OTHER PUBLICATIONS

Omori, T. et al., "Time-delay Compensation in Detection Electronics of Fast Scanning 2D SAW/BAW Laser Probe," 2009 IEEE International Ultrasonics Symposium, Sep. 20-23, 2009, pp. 1644-1647.

Ting, L., "The Analysis and Compensation of the Random Communication Delay in Networked Control Systems," Feb. 2018, 2 pages (abstract).

\* cited by examiner

LATENCY COMPENSATION METHOD AND DEVICE

CROSS-REFERENCE TO RELATED APPLICATIONS

This application is a continuation of International Application No. PCT/CN2019/077715, filed on Mar. 11, 2019, which claims priority to Chinese Patent Application No. 201810203433.5, filed on Mar. 13, 2018. The disclosures of the aforementioned applications are hereby incorporated by reference in their entireties.

TECHNICAL FIELD

The present application relates to the field of communications technologies, and in particular, to a latency compensation method and a device.

BACKGROUND

With diversified applications and services in an internet protocol (IP) network, the development of the IP network often needs to meet a requirement for a higher bandwidth at a current Ethernet interface rate. A flexible Ethernet (FlexE) technology provides a general mechanism that supports a plurality of types of Ethernet media access control (MAC) rates, whose speed is no longer limited by a physical layer rate, and can meet requirements of a plurality of types of service rates.

To resolve an ultra-low latency problem, FlexE cross-connect serves as an emerging Ethernet switching technology. Because of its ultra-low latency and ultra-low jitter forwarding feature, the FlexE cross-connect is applied to scenarios, such as a 5G mobile service bearer and a power relay protection service bearer, that often have strict requirements on latency information transmission. Therefore, controlling latency of a device in a bearer network is important for achieving time synchronization. A time synchronization method for a conventional mobile bearer network is connecting one time server to each base station to achieve time synchronization. However, the solution needs to deploy a large quantity of time servers and GPSs, and is costly and difficult to deploy. Another solution is deploying one or several time servers in the bearer network, to transparently transmit time information to a base station by using the bearer network. The solution needs that each device in the bearer network supports a capability of processing a precision time protocol (PTP) packet and complex calculation of a protocol state machine, and configuration, management, and maintenance are comparatively complex.

SUMMARY

Embodiments of this application provide a latency compensation method and a device, to compensate for latency of a bidirectional data flow by using the device, so that the device controls the latency of the data flow.

According to a first aspect, this application provides a latency compensation method, and the method includes: determining, by a device, a first latency value of a first data flow from a first physical port of the device to a second physical port of the device, where the first physical port is an ingress port for the first data flow, and the second physical port is an egress port for the first data flow; determining, by the device, a second latency value of a second data flow from the second physical port to the first physical port, where the second physical port is an ingress port for the second data flow, and the first physical port is an egress port for the second data flow; when the first latency value is less than the second latency value, determining, by the device, a first target latency value based on the first latency value and the second latency value; and adjusting, by the device, a latency value of the first data flow to the first target latency value.

According to the foregoing method, the device determines the first target latency value based on the first latency value of the first data flow and the second latency value of the second data flow, and adjusts the latency value of the first data flow to be equal to the first target latency value. In this way, the device adjusts the latency value of the first data flow of a bidirectional data flow.

With reference to the first aspect, in a first possible implementation, the first target latency value is equal to the second latency value.

In the foregoing method, the device determines that the first target latency value is equal to the second latency value, so that the latency value of the first data flow is adjusted to be equal to the second latency value of the second data flow. Therefore, the device can perform symmetric compensation on the bidirectional data flow, so that the latency value of the first data flow from the first physical port of the device to the second physical port is equal to latency of the second data flow from the second physical port of the device to the first physical port, and a time synchronization packet can be transparently transmitted. This avoids that all devices that transmit the time synchronization packet need to be capable of processing the IEEE1588 protocol.

With reference to the first aspect, in a second possible implementation, when the first target latency value is greater than the second latency value, and the method further includes: adjusting, by the device, a latency value of the second data flow to the first target latency value.

In the foregoing method, when the first target latency value is greater than the second latency value, the device adjusts the latency value of the second data flow to the first target latency value, so that the latency value of the first data flow may be equal to the latency value of the second data flow. To be specific, the device adjusts both the latency value of the first data flow and the latency value of the second data flow to the first target latency value, so that the latency value of the first data flow from the first physical port of the device to the second physical port is equal to the latency value of the second data flow from the second physical port to the first physical port. In other words, the device compensates for latency, so that latency values of the bidirectional data flow in the device are equal.

With reference to the first aspect, in a third possible implementation, the method further includes: determining, by the device, a second target latency value based on the first latency value and the second latency value; and adjusting, by the device, a latency value of the second data flow to the second target latency value.

In the foregoing method, the device determines the second target latency value based on the first latency value and the second latency value, and adjusts the latency value of the second data flow to the second target latency value, so that the device can adjust latency of the second data flow.

With reference to the first aspect, in a fourth possible implementation, the second physical port determines the first latency value, and the first physical port determines the second latency value includes: adding, by the second physical cal port, the first latency value to the second data flow; receiving, by the first physical port, the first latency value carried in the second data flow; and determining, by the device, the first target latency value based on the first latency value received by the first physical port and the second latency value determined by the first physical port.

In the foregoing method, the second physical port adds the first latency value to the second data flow, and the first physical port determines the first target latency value based on the received first latency value and the determined second latency value, so that the device determines the first target latency value based on the first latency value of the first data flow.

According to a second aspect, this application provides a device, configured to perform the method in any one of the first aspect or the possible designs of the first aspect, and specifically, the device includes a module configured to perform the method according to any one of the first aspect or the possible implementations of the first aspect.

According to a third aspect, this application provides a device, including a network interface, a processor, and a memory, and the network interface, the processor, and the memory may be connected by using a bus system, where the memory is configured to store a program, an instruction, or code, and the processor is configured to execute the program, the instruction, or the code in the memory, to complete an operation other than information receiving and sending performed by the device in the method in any one of the first aspect or the possible designs of the first aspect.

According to the fourth aspect, this application provides a computer-readable storage medium, where the computer-readable storage medium stores an instruction, and when the instruction is run on a computer, the computer is enabled to perform the instruction in the method according to any one of the first aspect or the possible implementations of the first aspect.

DETAILED DESCRIPTION OF ILLUSTRATIVE EMBODIMENTS

In the specification, claims, and accompanying drawings of the present application, the terms "first", "second", and so on (if existent) are intended to distinguish between similar objects but do not necessarily indicate a specific order or sequence. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
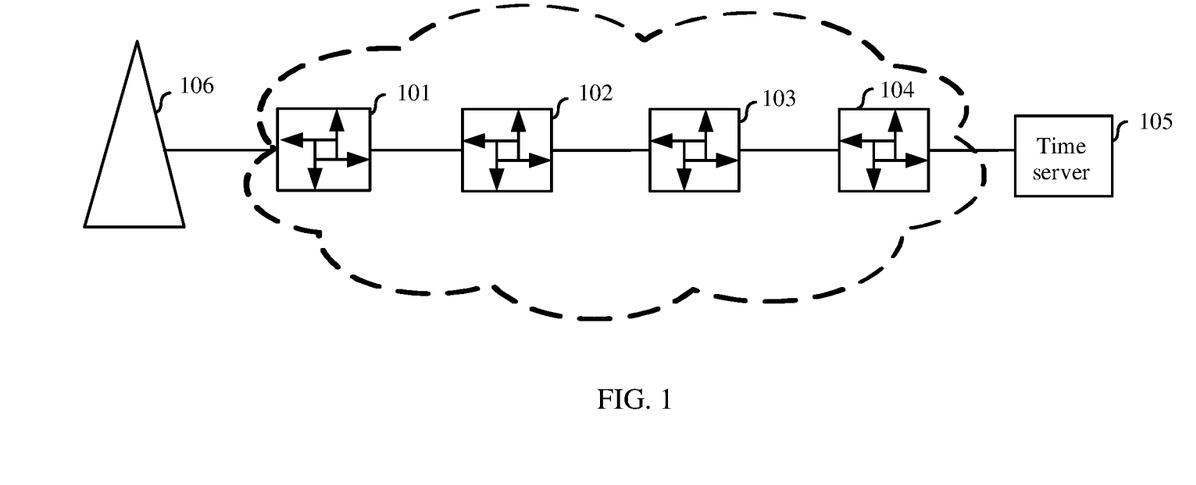
FIG. 1 is a schematic diagram of a scenario to which a latency compensation method is applicable according to an embodiment of the present application.

FIG. 1 is a schematic architectural diagram of a latency compensation system. The system may be a conventional mobile bearer network, and devices 101 to 104 in the network system may be devices that support a FlexE technology. In the network system shown in FIG. 1, a related time synchronization method may be deploying one or several time servers in the bearer network, to send time information to a base station by using the bearer network.

FIG. 1 specifically shows the time synchronization method. A time server 105 obtains latency information coding from a GPS satellite, a precision clock synchronization protocol (Precision Time Protocol, PTP), or the like, and sends the time information to a device 104. Then, the clock synchronization is performed based on a relationship from a primary device to a secondary device. For example, the primary device 104 releases the time information to a secondary device 103, and the device 103 serves as a primary device to release the time information to a secondary device 102. However, in a process of implementing the time synchronization by using the method, there are problems such as latency is undetermined when an IEEE1588 synchronization packet is forwarded in a device that supports the FlexE, and bidirectional latency are unequal. Therefore, the devices 101 to 104 in the bearer network need to run the IEEE1588 synchronization packet hop by hop. As shown in the process of implementing the time synchronization of the IEEE1588 synchronization packet, each device in the bearer network needs to support reception and sending processing of the IEEE1588 synchronization packet and complex calculation of a protocol state machine, and configuration, management, and maintenance are comparatively complex.

Figure 2:
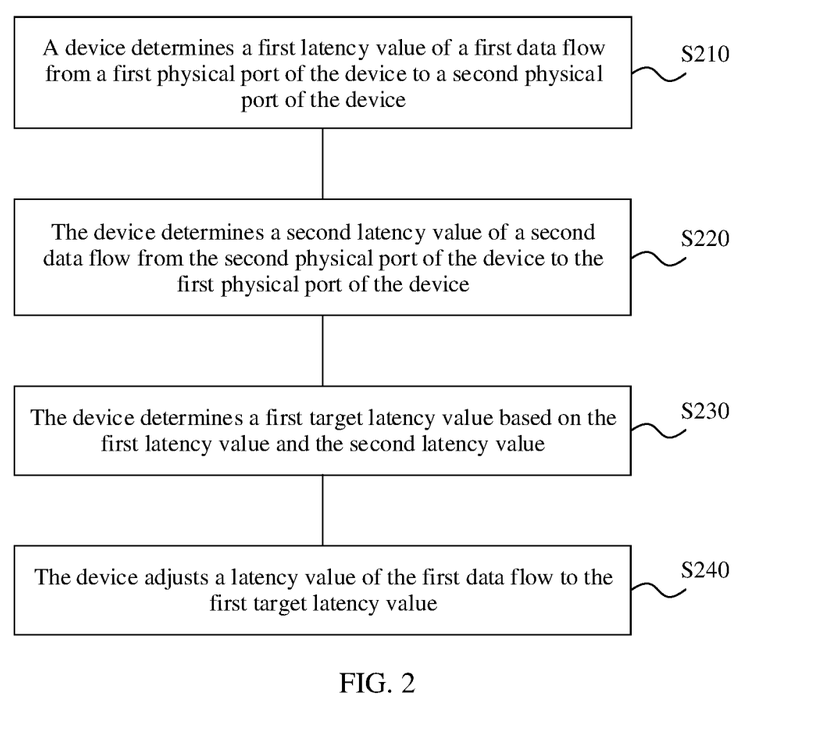
FIG. 2 is a schematic flowchart of a latency compensation method according to an embodiment of the present application.

To resolve the foregoing technical problem, transparently transmit a time synchronization packet by the device, and reduce complexity of processing the IEEE1588 synchronization packet by the device, how the device controls latency of a bidirectional data flow needs to be resolved. A specific method may be: The device compensates for latency of the data flow, so that latency values of the bidirectional data flow in the device keep stable, for example, the device may compensate for the latency values bidirectional data flow to implement equal latency values of the bidirectional data flow, or the device may compensate for latency of the bidirectional data flow, so that the latency values of the bidirectional data flow keeps a stable difference. Therefore, the time synchronization packet can be transparently transmitted, and the device does not need to measure, by using the IEEE1588 protocol, the latency of the data flow processed by the device. FIG. 2 is a schematic flowchart of a latency compensation method according to this application. A device in FIG. 2 may be any one of the devices 101 to 104 in FIG. 1. The method includes the following content.

S210: The device determines a first latency value of a first data flow from a first physical port of the device to a second physical port of the device.

In an implementation, the first data flow may be an Ethernet physical-layer data flow, for example, the first data flow may be an IEEE1588 time synchronization packet, or a network time protocol (NTP) packet, may be a time division multiplexing (TDM) data flow, or the like. A type of the first data flow is not specifically limited in this application. For ease of description, in the specification of this application, forward latency represents latency of the first data flow in a direction from the first physical port of the device to the second physical port, and reverse latency represents latency of a second data flow in a direction from the second physical port to the first physical port.

In an implementation, in a process in which the first data flow arrives at the second physical port from the first physical port of the device, the device may mark a first time stamp of the first data flow by using the first physical port, and mark a second time stamp by using the second physical port. A form of marking a time stamp may be: The first physical port adds the first time stamp to a data block, or when the first data flow arrives at the first physical port, the first physical port marks the first time stamp and reports the first time stamp to a processor of the device. Alternatively, the device may mark the time stamp in another known manner. A manner of marking the time stamp is not limited in this application. For a manner of marking the second time stamp by using the second physical port, refer to the manner of marking the first time stamp. The latency value of the first data flow from the first physical port of the device to the second physical port of the device is a value D1 obtained by subtracting a first time stamp value from a second time stamp value.

For example, in different scenarios, the device may determine the first time stamp by using, but not limited to, the following several manners.

Manner 1: The device may be the device 102 or 103 in the bearer network in FIG. 1. Both an ingress port and an egress port used by the device to send the first data flow are FlexE ports. In other words, both the first physical port and the second physical port are FlexE ports. The FlexE port may further be classified into a single-physical layer (PHY) scenario and a multi-PHY scenario based on different application scenarios. The multi-PHY scenario may be understood as a combination of plurality of groups of single-PHYs.

The following describes in detail a manner of determining the forward latency by the device by using an example in which both the first physical port and the second physical port of the device are single-PHYs. The first physical port is configured to receive the first data flow, send the second data flow, and convert the received first data flow into an internally parallel signal or convert the sent second data flow from an internally parallel signal into a data flow that can be transmitted on an external medium. Specifically, the first physical port of the device receives the first data flow, and converts the first data flow into a first data block. When receiving the first data block, physical medium attachment (PMA) sublayer of the first physical port may record the first time stamp t1 by using a first bit of the first data block, and record each group of data blocks. After being processed by the PMA and a physical coding sublayer (PCS), the first data block carrying the mark t1 is converted into a 64-bit/66-bit data block. To more accurately calculate the forward latency, when the first data block is converted into the 64-bit/66-bit data block, the device may mark an ingress time stamp of the 64-bit/66-bit data block as T1, where the time stamp T1 is obtained after conversion by using the time stamp t1 and a location offset of the first bit of the first data block against a first bit of the 64-bit/66-bit data block. The 64-bit/66-bit data block and the time stamp T1 are sent from the first physical port to the second physical port. In other words, the 64-bit/66-bit data block and the time stamp T1 are sent from an ingress port of the device to an egress port of the device. Before being sent to the second physical port, the 64-bit/66-bit data block carrying the time stamp flag T1 may further be processed by another module of the device. This is not limited.

The second physical port of the device receives the 64-bit/66-bit data block and the time stamp T1, identifies and extracts the time stamp T1, and obtains a value of T1. The 64-bit/66-bit data block is sent to a PMA of the second physical port after being processed by the second physical port. The PMA of the second physical port records, by using the first bit of the data block, an egress time stamp T2 of the first data flow that passes through the PMA of the second physical port, and converts the data block into the first data flow. A method for calculating a forward latency value may be calculating a difference between T2 and T1, or may be calculating a difference between T2 and t1.

To reduce a bandwidth occupied by the time stamp, for example, in a manner of sampling the first data flow, the time stamp is marked only in a sampled data block.

Manner 2: When the device is the device 104 in FIG. 1, the device is an access device in a bearer network. When an ingress port of the device is a common Ethernet (ETH) port, and an egress port is a FlexE port, in other words, when the first physical port of the device is the common Ethernet port, and the second physical port is the FlexE port, for a method for measuring and calculating the forward latency by the device, refer to the foregoing measurement and calculation method when both the ingress port and the egress port of the device are the FlexE ports. The first physical port may mark the first time stamp of the first data flow, and the second physical port may mark the second time stamp of the first data flow that arrives at the egress port. The device may obtain the forward latency value by calculating a difference between the second time stamp and the first time stamp. For a specific method, refer to the description in Manner 1. Details are not described herein again.

Manner 3: The device may alternatively be an access device for a common public radio interface (CPRI) service. The CPRI is a service interface between a remote radio unit (RRU) and a baseband unit (BBU) in a mobile fronthaul network, and the device has a very strict requirement on a difference between transmission latency and bidirectional latency. In the CPRI service, the method for measuring the forward latency in the scenario in which both the ingress port and the egress port of the device are the FlexE ports may also be used. For the specific measurement method, refer to the method for measuring the forward latency in the scenario in which both the ingress port and the egress port of the device are the FlexE ports. Details are not described herein again.

Manner 4: The device is an access device for a constant bit rate (CBR) service. In other words, an ingress port of the device is a CBR service port, and may be referred to as the first physical port, and an egress port is a FlexE port, and may be referred to as the second physical port. The ingress port of the service access device is the CBR service port, and therefore there is no PMA in the CBR service port at a service processing part. In a scenario in which the CBR service is accessed, the first time stamp needs to be marked when a frame (Framer) module of the first physical port receives the packet. The second physical port is the FlexE port. When the first data flow arrives at the second physical port, the second time stamp may be marked on a PMA of the second physical port. Similarly, the forward latency value may be obtained by calculating a difference between the second time stamp and the first time stamp.

S220: The device determines a second latency value of the second data flow from the second physical port to the first physical port, where the first latency value is less than the second latency value.

In an implementation, a latency of the second data flow from the second physical port of the device to the first physical port is referred to as the reverse latency. A person of ordinary skill in the art may learn that, the forward latency value determined by the device through detection and the reverse latency value are not equal in most cases, may be that the forward latency value is greater than the reverse latency value, or may be that the reverse latency value is greater than the forward latency value. In this application, an example in which the forward latency value is less than the reverse latency value is used for description below.

In an implementation, for a method for measuring the reverse latency value, refer to the method for measuring the forward latency.

For example, both an ingress port and an egress port used by the device to send the second data flow may be the FlexE ports. In other words, both the first physical port and the second physical port are the FlexE ports. The reverse latency value may be determined with reference to the method in Manner 1 in step S210.

For example, the ingress port of the device may be the common Ethernet port, and the egress port is the FlexE port. In other words, the first physical port of the device is the common Ethernet port, and the second physical port is the FlexE port. The reverse latency value of the device may be determined with reference to Manner 2 in step S210.

For example, the device may alternatively be the access device for the CPRI service. In the CPRI service, both the ingress port and the egress port of the device are the FlexE ports. For a specific method for determining the reverse latency, refer to the method in the scenario in which both the ingress port and the egress port of the device are the FlexE the ports, to determine the reverse latency value of the device.

For example, the device is the access device for the CBR service. In other words, the ingress port of the device is the CBR service port. The reverse latency value of the device may be determined with reference to Manner 4 in step S210.

In an implementation, the device may determine the first latency value by using the second physical port, and determine the second latency value by using the first physical port. The second physical port adds the first latency value to the second data flow. The first physical port receives the first latency value carried in the second data flow. The device determines a first target latency value based on the first latency value received by the first physical port and the second latency value determined by the first physical port.

S230: The device determines the first target latency value based on the first latency value and the second latency value.

In an implementation, the device may determine the first target latency value based on the first latency value and the second latency value, where the first target latency value may be greater than or equal to a larger value between the first latency value and the second latency value.

For example, the device determines that the first latency is 0.5 s and the second latency is 0.8 s, and the device may set the first target latency value to be a value greater than or equal to the second latency value. For example, the device may set the first target latency value to be 0.8 s, or may set the first target latency value to be is.

In an implementation, after the device determines, by using the second physical port in step S210, the first latency value for processing the first data flow by the device, the second physical port of the device may add the first latency value to the second data flow. The second physical port sends the second data flow carrying the first latency value to the first physical port. The first physical port may receive the second data flow carrying the first latency value, to determine the second latency value of the second data flow and extract the first latency value. The second physical port determines the first target latency value based on the obtained first latency value and second latency value.

S240: The device adjusts a latency value of the first data flow to the first target latency value.

In an implementation, the device compensates for latency of the first data flow based on the first latency value of the first data flow to adjust the latency value of the first data flow to the first target latency value. In other words, the device compensates for the latency of the first data flow before sending the first data flow by using the second physical port. Specifically, the device may obtain, through calculation, that a difference between the first latency value and the first target latency value is D1, and the device configures D1 into a buffer of the device. After the first data flow is converted into the first data block, an idle data block is added to the first data block to compensate for D1. To be specific, the latency of the first data flow is adjusted to the first target latency value. In this way, the device adjusts the forward latency value of the first data flow to be equal to the first target latency value. A specific location at which the device adds the idle data block to the first data flow may be properly placed based on an actual design. This is not limited in this application.

The device may set the first target latency value to be equal to the larger value between the first latency value and the second latency value, or may set the first target latency value to be greater than the larger value. In this implementation, the larger value is the second latency value. When the first target latency value is set to be greater than the larger value, the latency value of the first data flow may be adjusted to be equal to the first target latency value, and a latency value of the second data flow may be adjusted to be equal to the first target latency value.

Step S240 may further include: the device determines, based on the first latency value and the second latency value, a second target latency value that is unequal to the first target latency value. The second target latency value is a value greater than the larger value. The device may adjust the latency value of the first data flow to be equal to the first target latency value, or may adjust the latency value of the second data flow to be equal to the second target latency value.

In an implementation, a factor that causes undetermined latency mainly occurs in a service initialization phase or a frequency out-of-synchronization state. During latency measurement, transmitting a time stamp inside the device consumes a service bandwidth. Therefore, a greater quantity of measurement times consumes more bandwidth resources. To save the bandwidth, the foregoing latency compensation method may be started only after the service initialization is completed and frequency synchronization is performed.

According to the foregoing method, when the device receives a bidirectional data flow, both latency of the data flow from the first physical port to the second physical port and latency of the data flow from the second physical port to the first physical port are accurately measured. The device sets a target latency value to adjust the latency of the first data flow or the latency of the second data flow, so as to control a latency value of the bidirectional flow that passes through the device. For example, the device adjusts the forward latency of the first data flow or the reverse latency of the second data flow, so that the forward latency value of the first data flow is equal to a reverse latency value of the second data flow. Therefore, time synchronization information can be transparently transmitted, to resolve a technical problem that a conventional device needs to rely on the IEEE1588 technology to transparently transmit time information, and all devices in the bearer network do not need to be capable of processing the IEEE1588 packet. Therefore, complexity of network configuration, management, and maintenance is greatly reduced.

Figure 3:
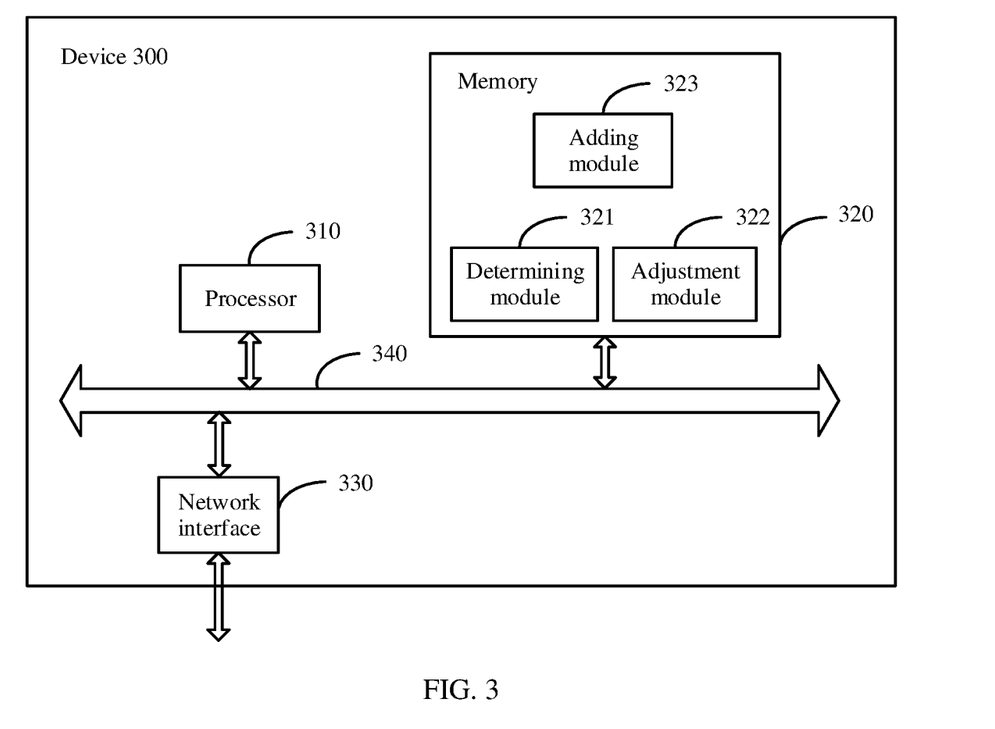
FIG. 3 is a schematic structural diagram of a device according to an embodiment of the present application.

FIG. 3 is a schematic structural diagram of a device 300 according to an embodiment of this application. The device 300 may be applied to the network architecture shown in FIG. 1, for example, the device 300 may be any one of the devices 101 to 104 in the network architecture shown in FIG. 1, and the device 300 may implement a function of any one of the devices 101 to 104. As shown in FIG. 3, the device 300 may include a processor 310, a memory 320 coupled and connect to the processor 310, and a network interface 330.

The processor 310 may be a central processing unit (CPU), a network processor (NP), or a combination of a CPU and an NP.

The processor 310 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor 310 may be one processor, or may include a plurality of processors.

The memory 320 may include a volatile memory, for example, a random access memory (RAM). The memory may also include a non-volatile memory, for example, a read-only memory (ROM), a flash memory, a hard disk drive (HDD), or a solid-state drive (SSD). The memory 320 may further include a combination of the foregoing types of memories.

In an implementation, the memory 320 may include a plurality of software modules, for example, a determining module 321 and an adjustment module 322. By executing an instruction in the foregoing software module, the processor 310 may be configured to perform a plurality of operations. The memory 320 may be one memory, or may include a plurality of memories. In some implementations, when one module is configured to perform an operation, it may actually represent that the processor 310 is configured to execute the instruction in the module to complete the foregoing operation. By executing an instruction in the memory 320, the processor 310 may perform some or all operations performed by the device in the methods 210 to 240. For example, the processor 310 may receive a first data flow and a second data flow through the network interface 330.

A bus 340 may include any quantity of interconnected buses and bridges, and the bus 340 links together one or more processors 310 represented by the processor 310 and various circuits of a memory represented by the memory 320. The bus 340 may further link various other circuits together, such as a peripheral device, a voltage stabilizer, and a power management circuit. These are all well known in the art, and therefore are not further described in this specification.

The determining module 321 is configured to determine a first latency value of the first data flow from a first physical port of the device to a second physical port of the device, where the first physical port is an ingress port for the first data flow, and the second physical port is an egress port for the first data flow. The determining module 321 is further configured to determine a second latency value of the second data flow from the second physical port to the first physical port, where the second physical port is an ingress port for the second data flow, the first physical port is an egress port for the second data flow, and the first latency value is less than the second latency value. The determining module 321 is further configured to determine a first target latency value based on the first latency value and the second latency value.

The adjustment module 322 is configured to adjust a latency value of the first data flow to the first target latency value.

In a specific implementation, the first target latency value is equal to the second latency value.

In a specific implementation, when the first target latency value is greater than the second latency value, the adjustment module 322 is further configured to adjust a latency value of the second data flow to the first target latency value.

In a specific implementation, the determining unit 321 is further configured to determine a second target latency value based on the first latency value and the second latency value, and the adjustment module 322 is further configured to adjust the latency value of the second data flow to the second target latency value.

In a specific implementation, the device 300 may further include an adding module 323, and the adding module is configured to add the first latency value to the second data flow. The network interface 330 receives the first latency value carried in the second data flow. The determining module 321 is configured to determine the first target latency value based on the first latency value received by the first physical port and the second latency value determined by the first physical port.

In the foregoing specific implementation, for specific implementations of the processor 310, the memory 320, and the network interface 330, refer to functions and operations of the device in FIG. 2. For brevity, details are not described herein again. Operations performed by the software modules are actually directly or indirectly performed by the processor 310 according to the instructions in the software modules.

It should be understood that sequence numbers of the foregoing method do not mean execution sequences in various embodiments of this application. The execution sequences of the method should be determined according to functions and internal logic of the method, and should not be construed as any limitation on the implementation processes of the embodiments of this application.

In the several embodiments provided in this application, it should be understood that the disclosed method and device may be implemented in other manners. For example, the described apparatus embodiment is merely an example. For example, division into modules is merely logical function division and may be other division manners in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions of the embodiments.

In addition, functional modules in the embodiments of the present application may be integrated into one processing unit, or each of the modules may exist alone physically, or two or more modules are integrated into one module. The integrated module may be implemented in a form of hardware, or may be implemented in a form of hardware in addition to a software functional unit.

When the integrated unit is implemented in the form of hardware combined with software and sold or used as an independent product, the software may be stored in a computer-readable storage medium. Based on such an understanding, in the technical solutions of the present application, some technical features contributing to the prior art may be implemented in a form of a software product. The computer software product is stored in a storage medium and includes several instructions for instructing a computer device (which may be a personal computer, a server, or a device) to perform some or all operations of the methods described in the embodiments of the present application. The storage medium may be a USB flash disk, a removable hard disk, a read-only memory (ROM), a random access memory (RAM), a magnetic disk, or a compact disc. The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   determining, by a device, a first latency value of the device for a first data flow, wherein the first latency value is a latency value in time of the first data flow when the first data flow is transmitted from a first physical port of the device to a second physical port of the device, the first physical port is an ingress port for the first data flow, and the second physical port is an egress port for the first data flow;
   determining, by the device, a second latency value of the device for a second data flow, wherein the second latency value is a latency value in time of the second data flow when the second data flow is transmitted from the second physical port of the device to the first physical port of the device, the second physical port is an ingress port for the second data flow, the first physical port is an egress port for the second data flow, and the first latency value is less than the second latency value; and
   adjusting, by the device, a latency in time of the device for the first data flow when the first data flow is transmitted from the first physical port of the device to the second physical port of the device from the first latency value to a first target latency value in time of the device, wherein the first target latency value is greater than or equal to a larger value between the first latency value and the second latency value.

2. The method according to claim 1, wherein the first target latency value is equal to the second latency value.

3. The method according to claim 1, wherein the first target latency value is greater than the second latency value, and the method further comprises:
   adjusting, by the device, the latency of the second data flow when the second data flow is transmitted from the second physical port to the first physical port from the second latency value to the first target latency value.

4. The method according to claim 1, wherein adjusting, by the device, the latency of the first data flow when the first data flow is transmitted from the first physical port to the second physical port from the first latency value to the first target latency value comprises:
   adding, by the device, at least one idle data block to the first data flow, to adjust the latency of the first data flow when the first data flow is transmitted from the first physical port to the second physical port from the first latency value to the first target latency value.

5. The method according to claim 1, wherein determining, by the device, the first latency value of the first data flow comprises:
   marking, by the device, a first time stamp when the first data flow arrives at the first physical port;
   marking, by the device, a second time stamp when the second data flow arrives at the second physical port; and
   determining, by the device, the first latency value based on the first time stamp and the second time stamp.

6. The method according to claim 1, wherein at least one of the first physical port or the second physical port is a Flexible Ethernet (FlexE) port.

7. The method according to claim 1, further comprising:
   determining, by the device, a second target latency value based on the first latency value and the second latency value; and
   adjusting, by the device, the latency of the second data flow when the second data flow is transmitted from the second physical port to the first physical port from the second latency value to the second target latency value.

8. The method according to claim 1, wherein:
   the second physical port determines the first latency value, and the first physical port determines the second latency value; and
   the method further comprises:
      adding, by the second physical port, the first latency value to the second data flow;
      receiving, by the first physical port, the first latency value carried in the second data flow; and
      determining, by the device, the first target latency value based on the first latency value received by the first physical port and the second latency value determined by the first physical port.

9. A device, comprising:
   a non-transitory memory, wherein the non-transitory memory comprises an instruction; and
   a processor configured to communicate with the non-transitory memory, wherein the processor is configured to execute the instruction to:
      determine a first latency value of the device for a first data flow, wherein the first latency value is a latency value in time of the first data flow when the first data flow is transmitted from a first physical port of the device to a second physical port of the device, the first physical port is an ingress port for the first data flow, and the second physical port is an egress port for the first data flow;
      determine a second latency value of the device for a second data flow, wherein the second latency value is a latency value in time of the second data flow when the second data flow is transmitted from the second physical port of the device to the first physical port of the device, the second physical port is an ingress port for the second data flow, the first physical port is an egress port for the second data flow, and the first latency value is less than the second latency value; and
      adjust a latency in time of the device for the first data flow when the first data flow is transmitted from the first physical port of the device to the second physical port of the device from the first latency value to a first target latency value in time of the device, wherein the first target latency value is greater than or equal to a larger value between the first latency value and the second latency value.

10. The device according to claim 9, wherein the first target latency value is equal to the second latency value.

11. The device according to claim 9, wherein the first target latency value is greater than the second latency value, and the processor is further configured to execute the instruction to:
adjust the latency of the second data flow when the second data flow is transmitted from the second physical port to the first physical port from the second latency value to the first target latency value.

12. The device according to claim 9, wherein the processor is further configured to execute the instruction to:
determine a second target latency value based on the first latency value and the second latency value; and
adjust the latency of the second data flow when the second data flow is transmitted from the second physical port to the first physical port to the second target latency value.

13. The device according to claim 9, wherein the processor is further configured to execute the instruction to:
add, at the first physical port, the first latency value to the second data flow;
receive, at the second physical port, the first latency value carried in the second data flow; and
determine the first target latency value based on the first latency value and the second latency value.

14. The device according to claim 9, wherein the processor is configured to execute the instruction to:
add at least one idle data block to the first data flow, to adjust the latency of the first data flow when the first data flow is transmitted from the first physical port to the second physical port from the first latency value to the first target latency value.

15. The device according to claim 9, wherein the processor is configured to execute the instruction to:
mark a first time stamp when the first data flow arrives at the first physical port;
mark a second time stamp when the second data flow arrives at the second physical port; and
determine the first latency value based on the first time stamp and the second time stamp.

16. A non-transitory computer-readable storage medium, comprising instructions which, when executed by a device, cause the device to carry out the instructions to:
determine a first latency value of the device for a first data flow, wherein the first latency value is a latency value in time of the first data flow when the first data flow is transmitted from a first physical port of the device to a second physical port of the device, the first physical port is an ingress port for the first data flow, and the second physical port is an egress port for the first data flow;
determine a second latency value of the device for a second data flow, wherein the second latency value is a latency value in time of the second data flow when the second data flow is transmitted from the second physical port of the device to the first physical port of the device, the second physical port is an ingress port for the second data flow, the first physical port is an egress port for the second data flow, and the first latency value is less than the second latency value;
adjust a latency in time of the device for the first data flow when the first data flow is transmitted from the first physical port of the device to the second physical port of the device from the first latency value to a first target latency value in time of the device, wherein the first target latency value is greater than or equal to a larger value between the first latency value and the second latency value.

17. The non-transitory computer-readable storage medium according to claim 16, wherein the first target latency value is greater than the second latency value, and the instructions, when executed by the device, cause the device to carry out the instructions to:
adjust the latency of the second data flow when the second data flow is transmitted from the second physical port to the first physical port from the second latency value to the first target latency value.

18. The non-transitory computer-readable storage medium according to claim 16, wherein the instructions, when executed by the device, cause the device to carry out the instructions to:
add at least one idle data block to the first data flow, to adjust the latency of the first data flow when the first data flow is transmitted from the first physical port to the second physical port from the first latency value to the first target latency value.

19. The non-transitory computer-readable storage medium according to claim 18, wherein the instructions, when executed by the device, cause the device to carry out the instructions to:
mark a first time stamp when the first data flow arrives at the first physical port;
mark a second time stamp when the second data flow arrives at the second physical port; and
determine the first latency value based on the first time stamp and the second time stamp.

20. The method according to claim 1, wherein the first target latency value is less than a sum of the first latency value and the second latency value, and wherein the first data flow excludes any precision time protocol (PTP) packet.

* * * * *

UNITED STATES PATENT AND TRADEMARK OFFICE
CERTIFICATE OF CORRECTION

PATENT NO. : 11,641,266 B2
APPLICATION NO. : 17/018538
DATED : May 2, 2023
INVENTOR(S) : Yunlei Qi et al.

Page 1 of 1

It is certified that error appears in the above-identified patent and that said Letters Patent is hereby corrected as shown below:

In the Claims

Claim 16, Column 14, Line 9; insert -- and -- after "value;".

Signed and Sealed this
Thirteenth Day of June, 2023

Katherine Kelly Vidal
*Director of the United States Patent and Trademark Office*